Figure 1:
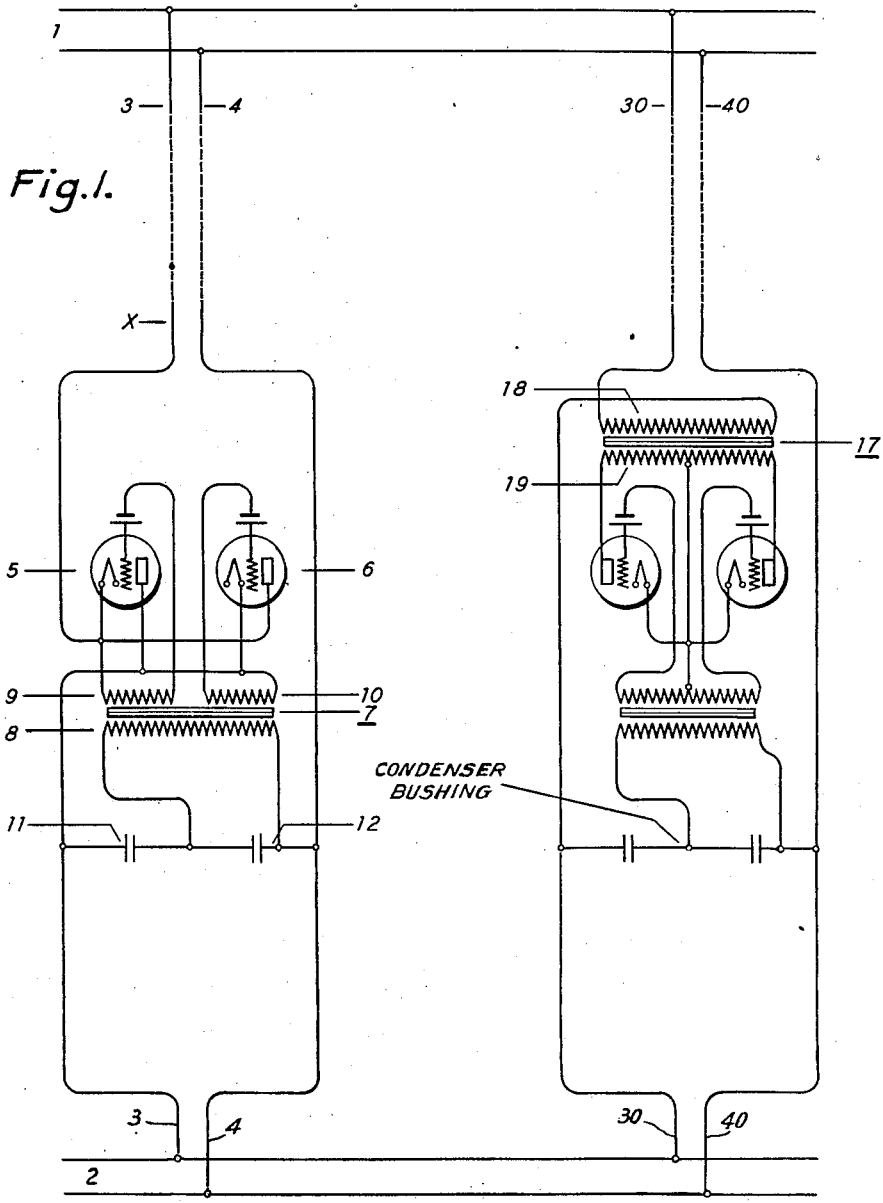

March 23, 1937.    A. S. FITZ GERALD    2,074,836
ALTERNATING CURRENT ELECTRIC POWER CONTROL SYSTEM
Filed Feb. 10, 1934

INVENTOR
Alan S. FitzGerald

Patented Mar. 23, 1937

2,074,836

UNITED STATES PATENT OFFICE 2,074,836

ALTERNATING CURRENT ELECTRIC POWER CONTROL SYSTEM

Alan S. Fitz Gerald, Wynnewood, Pa.

Application February 10, 1934, Serial No. 710,672
In Great Britain February 15, 1933

15 Claims. (Cl. 175—294)

This invention relates to alternating current electric power transmission and distribution systems and more particularly to apparatus of the type known as network protectors.

In alternating current power circuits, on the occasion of faults or short circuits, the normal direction of flow of power frequently becomes reversed, and one method of protecting the power system from the results of such faults is to provide reverse power relays and circuit breakers, whereby, when reversal of power takes place, the circuit breaker is operated and flow of power in the reverse direction interrupted by opening the circuit.

For example, when a substation, or a power distribution network, is supplied from a power source through two or more feeders, under normal conditions flow of power in the feeders is maintained in the forward direction. That is to say, power tends to flow in a direction away from the source towards the load.

On the occurrence of a fault on one of the feeders, however, reversal of the direction of power flow is likely to take place at the load end of the feeder on which the fault has occurred.

It is therefore customary to install at the load end of such feeders reverse power relays to trip the circuit breakers under this condition. By this means the flow of power into the fault, through other parallel sound feeders, is prevented, and the functioning of automatic protective apparatus, which may be installed at the power station end of the feeders, is facilitated.

The present invention has for its object the provision of means for accomplishing all of the advantages, accruing from the use of reverse power protection, in an improved and advantageous manner. Instead of providing means for detecting reversal of power and for interrupting the power circuit on the occurrence of power reversal, after it has occurred, the action of the present invention is entirely to prevent the flow of power in the reverse direction or, if desired, to limit the flow of power in the reverse direction to a predetermined value.

This result is accomplished by including in the power circuit an arrangement of electric valves which has the property of uni-laterally conducting alternating current power.

The novel features which I believe to be characteristic of my invention will be set forth with particularity, in the appended claims. My invention itself, however, both as to its organization and method of operation, together with further objects and advantages thereof, may best be understood by reference to the following description taken in connection with the accompanying drawing, in which Figure 1 is an electric circuit diagram of an embodiment of my invention; and Figure 2 is an electric circuit diagram of a modification of my invention.

Figure 2:
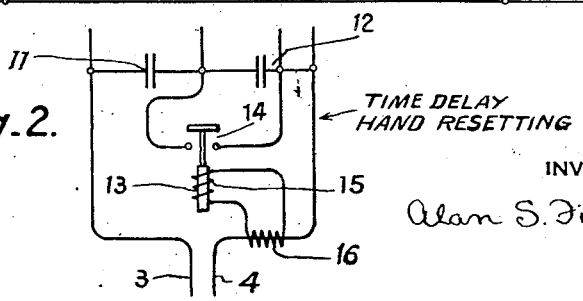

In Figure 1, I show a source of alternating current power 1 and a load circuit 2. Alternating current power is supplied from the source 1 to the load circuit 2 through conductors 3 and 4, which may be considered to represent a high tension transmission line connecting a power station to a receiving substation. Alternatively the conductors 3 and 4 may represent a feeder circuit and the load circuit 2 may represent an alternating current distribution network.

Included in the conductors 3 and 4, at the load end thereof, I show electric valves 5 and 6 connected together in parallel, in opposite sense, so as to be capable of conducting alternating current. The electric valves 5 and 6 should have such characteristics, obtained either by design of the valves or by the use of positive bias grid voltage, as indicated in the drawing, that the current is normally conducted between anode and cathode when the grid circuit is at the same potential as the cathode.

I show in the figure a grid transformer 7, having a primary winding 8, and two secondary windings 9 and 10. One end of the secondary winding 9 is connected to the cathode of the electric valve 5 and the other end to the grid of 5. Likewise the secondary winding 10 is connected to the cathode and grid of 6.

As indicated in the diagram, the polarity, or phase relation, of the grid excitation of electric valves 5 and 6 is opposite. That is to say, at any instant when the grid of 5 is raised to a potential positive with respect to the cathode of 5, the potential of the grid of 6, relative to the cathode of 6, is negative. It should, however, be noted that, while the grid excitation is opposite in phase, the anode circuits are also connected in opposite sense. The controlling action therefore of the grids of both of the electric valves 5 and 6 is in like sense. In other words, if the primary winding 8 of the grid transformer 7 be energized with an alternating voltage synchronous with the voltage applied to the anode circuits of electric valves 5 and 6, having phase relation such that the grid of 5 is energized through winding 9 with a positive voltage during the same half cycle that the anode of 5 is positive with respect to the cathode, at that instant the anode of 6 will be at a negative potential, relative to its cathode, and the grid of 6 will likewise be at a negative potential. Under these momentary conditions the electric valve 5 may conduct current between anode and cathode. The anode of 6 being negative no current can be conducted under these circumstances irrespective of what may be the grid potential.

During the next half cycle, however, assuming the same conditions of grid excitation, the anode of 5 will be at a negative potential relative to its cathode as will also be the grid of 5. Likewise both the anode and grid of 6 will be at a positive potential relative to the cathode of 6. The electric valve 6 therefore will likewise permit flow of current between anode and cathode during this half cycle.

It will be seen therefore that, under the conditions of grid excitation postulated, the electric valves 5 and 6 will permit alternating current power to flow in the conductors 3 and 4.

Let it now be assumed that the primary winding 8 of the grid transformer 7 be energized with an alternating voltage of the opposite polarity, that is, 180 degrees displaced with respect to the conditions previously assumed.

Under these circumstances, throughout a half cycle during which the anode of the electric valve 5 is positive, the grid will be at a negative potential thus precluding flow of current. At the same instant the grid of the electric valve 6 is raised to a positive potential but since the anode is negative no flow of current takes place. During the immediately following half cycle when the anode of electric valve 5 is negative and the anode of 6 is positive, still no flow of current takes place because, during this half cycle, the grid of 6 is negative.

It will be apparent, therefore, that if the grid transformer 7 be energized with an alternating voltage directly in phase with the voltage existing between the conductors 3 and 4 the valves 5 and 6 will each of them conduct half cycles of current thus permitting flow of alternating current power. Alternatively, if the grid transformer be excited with a voltage displaced 180 degrees with respect to the above condition neither of the valves will conduct and flow of alternating current power will be precluded.

As shown in the diagram I therefore arrange to excite the primary winding 8 of the grid transformer 7 with a voltage substantially in phase with that existing between the conductors 3 and 4. So far as the normal operation of my invention is concerned one extremity of 8 might be connected to the conductor 3 and the other end to conductor 4 on the load side of the electric valves 5 and 6. However, I prefer not to connect the winding 8 directly across the power circuit in view of the fact that this would furnish a path for uni-directional or rectified current in the event that one or other of the electric valves 5 and 6 should be removed or fail to function. I therefore prefer to excite the grid transformer 7 by means of a potential divider constituted by a pair of capacitors 11 and 12. As shown in the diagram the capacitors 11 and 12 are connected, in series, between the conductors 3 and 4 on the load side of the electric valves 5 and 6, and the grid transformer 7 is energized across the capacitor 12. It will be apparent that with this method of connection no rectified current can flow through the primary winding 8. It will be appreciated by those skilled in the art that a pair of resistors may be substituted for the capacitors 11 and 12 if desired, the resistors being given such value that any rectified current which might flow therein, when only one of the electric valves 5 and 6 is functioning, is limited to an unobjectionable value. However, I prefer to use capacitors for this purpose. The potential divider represented by the capacitors 11 and 12 may conveniently and economically be constituted, in the manner well known in the art, by a condenser bushing.

The operation of my invention may be more readily explained and understood if a typical case be considered in which a load circuit is supplied from an alternating current source through several transmission lines or feeders equipped in accordance with my invention.

I have therefore shown in the figure two transmission circuits for supplying power from the source 1 to the load 2. It is, however, to be clearly understood that my invention may be applied with utility and advantage to three or more such feeders.

In the figure 30, 40 represent the transmission line or feeder conductors similar to 3 and 4. The conductors 30, 40 include apparatus identical in function with the equipment shown included in the conductors 3 and 4 and arranged in an identical manner, except that in the second equipment I have shown a modification of my invention representing an alternative method of connection of the electric valves 5 and 6.

In the modified arrangement I show the electric valves 5 and 6 effectively included in conductor 30 by means of a transformer 17 having a primary winding 18 and a secondary winding 19. This arrangement may be preferred if the current and voltage rating of the power circuit differs materially from that at which it is most economical to construct electric valves. This arrangement is also more suitable for use in connection with electric valves having a common cathode as, for example, those of the mercury pool type. Apart from this method of connection the arrangement and function of the second equipment is identical with the description already furnished.

Both of the feeders being intact, the load circuit 2 will tend to draw power from the source 1 through the conductors 3 and 4, 30, 40 and the electric valves 5 and 6. As shown in the diagram the polarity of energization of the grid transformer 7 should be such that the grids of both the electric valves 5 and 6 are excited in phase with their respective anodes. That is to say, both grids are positive when the corresponding anodes are positive and under this condition alternating current power is freely conducted from the source 1 to the load circuit 2.

Let it now be supposed that a short circuit occurs between conductors 3 and 4 between the source 1 and the load end of the feeders, for example, at the point marked "X" in the figure. Due to the short circuit, substantially zero voltage will exist between the conductors 3 and 4 at the receiving end, that is to say, between the conductor 4 and the conductor 3 at the point where the latter is connected to the cathode of 5 and the anode of 6. The load circuit 2, however, is energized from the source 1 through 30, 40. As has already been explained the action of the electric valves 5 and 6 included in 30, 40 is such as to permit flow of power from the source 1 to the load circuit 2. Thus, since the load circuit 2 can draw power from the source 1, there will be a tendency for power to feed into the fault, from the source 1, in a forward direction through conductors 30, 40, through a portion of the load circuit 2, and, in the reverse direction through the conductors 3 and 4.

Under this condition the grid transformer 7 connected to 3, 4, will be energized, as before in accordance with the voltage which is applied to the load circuit 2. The phase relation of the excitation of the grid transformer 7 on the feeder which is short circuited will therefore be the same as that applied to the grid transformer 7 on the healthy feeder. However, due to the presence of the short circuit the voltage applied between anodes and cathodes of electric valves 5 and 6 is now reversed. It has been seen that a reversal of the relative polarity of the grid and anode voltages causes the electric valves 5 and 6 to be non-conducting. In accordance with my invention, therefore, alternating current power cannot be conducted in the reverse direction and no power can flow into the fault by way of the healthy feeder, conductors 30, 40 and the load circuit 2.

This circumstance presents a number of important advantages as will be well appreciated by those skilled in the art of electric power transmission, distribution, and relaying.

First, the magnitude of the short circuit is substantially restricted especially where there are many additional connecting circuits between the source 1 and the load circuit 2 since the fault can only be fed through a single line.

Second, the tendency to cause interruption of supply of power to circuits connected to the load circuit 2 is substantially reduced as the voltage supplied to the load circuit 2 is more easily sustained due to the action of my invention.

Third, the automatic disconnection of the faulty feeder by protective relay action at the outgoing end of the feeders is greatly facilitated in that all of the fault current flows in the faulty feeder and none in any of the healthy feeders.

A fourth advantage accrues in the case of feeder circuits supplying distribution networks. In such arrangements step-down transformers are commonly installed at the load end of the feeders. The use of apparatus according to my invention prevents flow of magnetizing current into the transformer, from the network, when the feeder is disconnected at the supply end.

It may, however, in certain instances be desirable to permit reverse power to flow in a limited amount, for example, not very greatly exceeding the normal rated load of the feeder. If there are other loads connected to the conductors 3 and 4 between the source 1 and the load circuit 2 it may under certain operating conditions be convenient to supply such loads by way of the load circuit 2 should the feeder circuit be temporarily opened at the source end either inadvertently or for maintenance purposes.

I show in Figure 2 a modified circuit arrangement conformable with the above operating conditions.

In Figure 2 I show a relay 13 having a circuit opening contact 14 connected across the capacitor 12, in parallel, therefore, with the primary winding 8 of the grid transformer 7. The relay 13 is preferably of the hand-resetting type and may advantageously embody a time-delay feature. The relay 13 has an operating coil 15 energized by a current transformer 16 connected in circuit with conductor 4. The contact of relay 13 being normally closed, the primary winding 8 of the grid transformer 7 is short circuited thereby, and no grid voltage is supplied by the grid transformer 7 to the grids of the electric valves 5 and 6. Accordingly, due to the characteristics of the electric valves 5 and 6, or to the positive bias applied to the grids as described above, so long as the contact 14 is closed there will be no directional action and power can be conducted in either direction by the conductors 3 and 4. If the relay 13 be set so as to trip at an overload value of current this will permit reverse power conditions to exist in respect of the conductors 3 and 4 so long as the current does not exceed the setting of the relay. If a short circuit occurs on the conductors 3 and 4 the relay will operate opening the contact 14 and energizing the grids of the electric valves 5 and 6 thus preventing flow of reverse power. If desired instantaneous reversals of power may be permitted by providing a time-delay action of the relay 13.

If the relay 13 be of the hand-resetting type reverse power will be prevented from flowing until such time that the relay be reset by hand.

Although I have chosen a particular embodiment of my invention for the purpose of explanation, many modifications thereof will be apparent to those skilled in the art to which it pertains. My invention, therefore, is not to be limited except insofar as is necessitated by the prior art and the spirit of the appended claims.

What I claim as new and desire to secure by Letters Patent of the United States is:

1. In an alternating current electric system, a first circuit, a second circuit, means effectively including space current means for transmitting alternating current power therebetween, a transformer energized by the alternating voltage existing across one of said circuits, for supplying to said space current means a plurality of voltages for controlling the action of said space current means so as to control the flow of alternating current between said circuits, and means for preventing flow of uni-directional current in the primary winding of said transformer.

2. In an alternating current electric system, a first circuit, a second circuit, and a plurality of electric valves, each of said valves having an anode, a cathode, and a control electrode, the cathode-anode circuits of said valves being oppositely connected to said circuits to conduct alternating current therebetween, a transformer energized from one of said circuits for supplying control voltages to said control electrodes for exercising a controlling effect upon said valves, and means connecting the primary winding of said transformer to said circuit for precluding the passage of direct current into said transformer, so as to prevent direct current saturation of said transformer core and resulting vitiation of said controlling action in the event that only one of said valves, at a time, should be conductive.

3. In an alternating current electric system, a first circuit, a second circuit, means effectively including space current means for transmitting alternating current power therebetween, a transformer energized by the alternating voltage existing across one of said circuits, for supplying to said space current means a plurality of voltages for controlling the action of said space current means so as to prevent flow of alternating current power from said second circuit to said first circuit, and means for preventing flow of uni-directional current in the primary winding of said transformer.

4. In an alternating current electric system, a first circuit, a second circuit, means effectively including space current means for transmitting alternating current power therebetween, and means energized solely by the alternating voltage existing across said second circuit for controlling the action of said space current means so as to permit alternating current power to flow from said first circuit to said second circuit and to prevent the flow of alternating current power from said second circuit to said first circuit.

5. In an alternating current electric system, a first circuit, a second circuit, means effectively including space current means for transmitting alternating current power therebetween, and means energized at all times solely by the alternating voltage existing across said second circuit for controlling the action of said space current means so as to permit alternating current power to flow from said first circuit to said second circuit and to prevent the flow of alternating current power from said second circuit to said first circuit.

6. In an alternating current electric system, a first circuit, a second circuit, means effectively including space current means for transmitting alternating current power therebetween, said space current means being of the normally conducting type, and means energized at all times solely by the alternating voltage existing across said second circuit for controlling the action of said space current means so as to permit alternating current power to flow from said first circuit to said second circuit and to prevent the flow of alternating current power from said second circuit to said first circuit.

7. In an alternating current electric system, a first circuit, a second circuit, means effectively including space current means for transmitting alternating current power therebetween, a transformer energized by the alternating voltage existing across the said second circuit, for supplying to said space current means a plurality of voltages for controlling the action of said space current means so as to prevent flow of alternating current power from said second circuit to said first circuit, and means for preventing flow of uni-directional current in the primary winding of said transformer.

8. In an alternating current electric system, a first circuit, a second circuit, means effectively including space current means for transmitting alternating current power therebetween, and a transformer, having its primary winding energized through a capacitor in accordance with the alternating voltage existing across the said second circuit, for supplying to said space current means a plurality of voltages for controlling the action of said means so as to prevent flow of alternating current power from said second circuit to said first circuit.

9. In an alternating current electric system, a first circuit, a second circuit, means effectively including space current means for transmitting alternating current power therebetween, and a transformer, having its primary winding energized through a condenser bushing in accordance with the alternating voltage existing across the said second circuit, for supplying to said space current means a plurality of voltages for controlling the action of said means so as to prevent flow of alternating current power from said second circuit to said first circuit.

10. In an alternating current electric system, a first circuit, a second circuit, means effectively including space current means for transmitting alternating current power therebetween, means for controlling said space current means so as to permit alternating current power to flow from said first circuit to said second circuit, and to prevent the flow of alternating current power from said second circuit to said first circuit, and further means for modifying said preventing action so as to permit a predetermined amount of alternating current power to flow from said second circuit to said first circuit.

11. In an alternating current electric system, a first circuit, a second circuit, means effectively including space current means for transmitting alternating current power therebetween, means for controlling said space current means so as to permit alternating current power to flow from said first circuit to said second circuit, and to prevent the flow of alternating current power from said second circuit to said first circuit, and further means energized in accordance with the current flowing between said circuits for modifying said preventing action.

12. In an alternating current electric system, a first circuit, a second circuit, means effectively including space current means for transmitting alternating current power therebetween, means for controlling said space current means so as to permit alternating current power to flow from said first circuit to said second circuit, and to prevent the flow of alternating current power from said second circuit to said first circuit, and further means for modifying said preventing action so as to permit alternating current power to flow from said second circuit to said first circuit for a predetermined period only.

13. In an alternating current electric system, a first circuit, a second circuit, means effectively including space current means having at least one cathode, a plurality of anodes, and a plurality of control electrodes, for transmitting alternating current power therebetween, a plurality of control circuits for said control electrodes, said space current means being conductive when said control electrode circuits are at the same potential as the cathode, and a transformer energized at all times solely by the alternating voltage existing across said second circuit for applying to said control electrodes alternating voltages such that, when power tends to flow from said first circuit to said second circuit, each of said control circuits is energized with a positive potential during half cycles when the corresponding anode is raised to a positive potential with respect to the cathode, and when power tends to flow from said second circuit, to said first circuit each of said control circuits is energized with a negative potential during half cycles when the corresponding anode is raised to a positive potential with respect to the cathode.

14. In an electric system, a source of alternating current power, a first circuit, a second circuit, means for connecting said source to one of said circuits, and a plurality of electric valves, each of said valves having an anode, a cathode, a control electrode, and a control circuit for said control electrode, means for causing said valves to be conductive when each of said control circuits is at the cathode potential, the cathode-anode circuits of said valves being oppositely connected to said circuits to conduct alternating current therebetween, a transformer having a primary winding and a plurality of secondary windings, each of said secondary windings being connected to one of said control circuits, means for energizing said primary winding with an alternating voltage having at all times a substantially constant phase relation to the voltage across said second circuit so as to permit flow of alternating current power from said first circuit to said second circuit and to prevent flow of alternating current power from said second circuit to said first circuit, and means including a condenser for preventing flow of uni-directional current in the primary winding of said transformer.

15. In an electric system, a source of alternating current power, a first circuit, a second circuit, means for connecting said source to one of said circuits, and a plurality of electric valves, each of said valves having an anode, a cathode, a control electrode, and a control circuit for each of said control electrodes, means for causing said valves to be conductive when each of said control circuits is at the cathode potential, a first transformer having a primary winding and a plurality of secondary windings, the cathode-anode circuits of said valves being oppositely connected to said secondary windings so as to cause the space current of said valves to magnetize the core of said transformer in opposite sense, said primary winding being connected between said first circuit and said second circuit so as to permit alternating current to flow therebetween in accordance with the space currents of said valves, a second transformer having a primary winding and a plurality of secondary windings, each of said secondary windings being connected to one of said control circuits, so that each of said control circuits is energized with a positive potential during half cycles when the corresponding anode is raised to a positive potential with respect to the cathode, means for energizing said primary winding with an alternating voltage having at all times a substantially constant phase relation to the voltage across said second circuit so as to permit flow of alternating current power from said first circuit to said second circuit and to prevent flow of alternating current power from said second circuit to said first circuit, and means including a condenser for preventing flow of uni-directional current in the primary winding of said second transformer.

ALAN S. FITZ GERALD.